United States Patent [19]

Morris et al.

[11] Patent Number: 4,739,033

[45] Date of Patent: Apr. 19, 1988

[54] POLYESTERS OF TRANS-4,4'-STILBENEDICARBOXYLIC ACID, 1,4-BUTANEDIOL AND 1,6-HEXANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 22

[22] Filed: Jan. 2, 1987

[51] Int. Cl.$^4$ .................. C08G 63/52; C08G 63/54
[52] U.S. Cl. .................. 528/306; 528/302; 528/308
[58] Field of Search .................. 528/306, 308, 302

[56] References Cited

U.S. PATENT DOCUMENTS 4,459,402 7/1984 Morris et al. .................. 528/298

Primary Examiner—Lucille M. Phynes
Attorney, Agent, or Firm—John F. Stevens; William P. Heath, Jr.

[57] ABSTRACT

The polyesters of trans-4,4'-stilbenedicarboxylic 5 acid, 5–95 mol % 1,4-butanediol, and 95–5 mol % 1,6-hexanediol can be injection-molded to give shaped objects having exceptionally high tensile strength and stiffness. Many of the copolyesters of this invention have excellent chemical resistance and good hydrolytic stability. The copolyesters can be injection-molded, spun into fiber, or extruded into film having these properties.

7 Claims, No Drawings

POLYESTERS OF TRANS-4,4'-STILBENEDICARBOXYLIC ACID, 1,4-BUTANEDIOL AND 1,6-HEXANEDIOL

TECHNICAL FIELD

This invention relates to high molecular weight copolyesters which are especially useful as films, fibers, and molding plastics. This invention is particularly concerned with copolyesters of trans-4,4'-stilbenedicarboxylic acid, 1,4-butanediol, and 1,6-hexanediol.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms, but copolyesters of 1,6-hexanediol and 1,4-butanediol are not specifically disclosed.

U.S. Pat. No. 3,496,839 relates to low molecular weight homopolymers of 4,4'-stilbenedicarboxylic acid and aliphatic glycols useful in radiation-cured crosslinked polyester coatings. 1,6-Hexanediol and 1,4-butanediol are disclosed in column 2, lines 20 to 44, in a general listing of the glycols useful in these coatings. No examples are given using a combination of butanediol and hexanediol. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607 (issued Dec. 13, 1983), U.S. Pat. No. 4,459,402 (issued Feb. 10, 1984), U.S. Pat. No. 4,468,510 (issued Aug. 28, 1984), U.S. Pat. No. 4,526,822 (issued July 2, 1985) all disclose polyesters based on trans-4,4'-stilbenedicarboxylic acid using various glycols which include 1,6-hexanediol and 1,4-butanediol. No examples of copolyesters based on these glycols are specifically disclosed.

Our U.S. Pat. No. 4,551,520 discloses copolyesters based on terephthalic acid, trans-4,4'-stilbenedicarboxylic acid and 1,4-cyclohexanedimethanol.

Other patents which disclose trans-4,4'-stilbenedicarboxylic acid are Japanese Kokai 72348/74, and U.S. Pat. Nos. 2,657,194, 3,190,174, 3,247,043, 3,842,040, 3,842,041, and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al., in the *British Polymer Journal*, Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia*, 41, 307–326(1985). Our copending applications filed of even date herewith entitled, "Polyesters of trans-4,4'-Stilbenedicarboxylic Acid, 1,6-Hexanediol, and 1,4-Cyclohexanedimethanol" and "Polyesters of trans-4,4'-Stilbenedicarboxylic Acid, 1,4-Butanediol, and Ethylene Glycol" also disclose polyesters based on trans-4,4'-stilbenedicarboxylic acid. No examples of copolyesters based on these 1,4-butanediol and 1,6-hexanediol are specifically disclosed.

DISCLOSURE OF THE INVENTION

The prior art discloses molding, spinning, and extrusion into film as viable processes for shaping polymers based on stilbenedicarboxylic acid. We have discovered copolyesters based on trans-4,4'-stilbenedicarboxylic acid, 1,6-hexanediol, and 1,4-butanediol having a combination of high tensile, flexural and impact strengths, good processability, good chemical resistance, high heat deflection temperature and high flexural modulus.

According to the present invention, there is provided a copolyester comprising repeating units from at least 80 mol % trans-4,4'-stilbenedicarboxylic acid, repeating units from about 5–95 mol % 1,4-butanediol and repeating units from about 95–5 mol % 1,6-hexanediol, the total mol % of acid components and glycol components each being 100 mol %, and the polyester having an inherent viscosity of 0.3 or more determined at 25° C. in 25/35/40 (wt/wt/wt) phenol/tetrachloroethane/chlorophenol at a concentration of 0.1/100 mL.

Injection-molded bars of copolyesters consisting of repeating units from 100 mol % trans-4,4'-stilbenedicarboxylic acid (SDA), repeating units from 95 to 5 mol % 1,6-hexanediol (HD), and repeating units from 5 to 95 mol % 1,4-butanediol (BD) have improved tensile strength (Table 1). The homopolyester of SDA and 1,6-hexanediol and the homopolyester of SDA and 1,4-butanediol both have a tensile sterength of about 18,000 psi. Modification of the hexanediol homopolyester with as little as 5 mol % 1,4-butanediol raises the tensile strength over 50%.

In addition, the copolyesters of this invention have excellent solvent resistance. Injection-molded bars are unaffected after exposure for 24 hrs. to toluene, 1,2-dichloroethane, methyl isobutyl ketone, ethyl acetate, ethanol, water, 20% sulfuric acid, 10% sodium hydroxide, regular grade gasoline, acetone, acetic acid, 5% Chlorox bleach, 50/50 water/ethanol, benzyl alcohol, 10% nitric acid and methylene chloride.

The polyesters of this invention are prepared from trans-4,4'-stilbenedicarboxylic acid and/or its esters, 1,6-hexanediol, and 1,4-butanediol. Examples of useful esters are the dimethyl, diethyl, dibutyl, diphenyl, etc. or any combination of these mixed esters. The polyesters may also be prepared from glycol esters or half-ester/half-acid derivatives of trans-4,4'-stilbenedicarboxylic acid.

The trans-4,4'-stilbenedicarboxylic acid portion of the polymers may contain minor amounts of other aromatic dicarboxylic acids such as terephthalic acid, isophthalic acid, 1,5-, 1,4-, 2,6-, or 2,7-naphthalenedicarboxylic acid, 4,4'-biphenyldicarboxylic acid, and the like. The dicarboxylic acid portion of the polymer may also contain minor amounts of aliphatic or cycloaliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially pure trans-4,4'-stilbenedicarboxylic is preferred.

The glycol portion of these polymers may contain minor amounts (not exceeding about 20 mol %) of other glycols such that the sum of the glycol components is equal to 100 mol %. Examples of useful glycols are ethylene glycol, 1,2-propanediol, 1,3-propanediol, 2,2-dimethyl-1,3-propanediol, trans- or cis-2,2,4,4-tetramethyl-1,3-cyclobutanediol, 1,5-pentanediol, 1,3- or 1,4-cyclohexanedimethanol, or p-xylenediol.

In addition, polyamides such as nylon 6,6, poly(etherimides) such as Ultem poly(ether-imide), polyphenylene oxides such as poly(2,6-dimethylphenylene oxide) or polyphenylene oxide/polystyrene blends such as Noryl, polyesters, poly(estercarbonates), polycarbonates such as Lexan, polysulfones, poly(sulfone-ethers), and poly(ether-ketones) of aromatic dihydroxy compounds may be used as blend modifiers to modify the properties.

The copolyesters of this invention may contain antioxidants, conventional flame retardants such as phosphorus or halogen compounds, fillers such as talc or mica, or reinforcing agents such as glass fiber or carbon fiber.

The inherent viscosity of the copolyesters of this invention are at least 0.3 and preferably 0.6 or more. The copolyesters are prepared in the melt or by solid-phase polymerization or by a combination of these processes, all known to those skilled in the art.

The examples which follow are submitted for a better understanding of the invention. The examples illustrate the exceptionally high tensile strengths of the copolyesters of this invention (Table 1).

The inherent viscosities are determined at 25° C. in 25/35/40 (wt/wt/wt) phenol/tetrachloroethanol/p-chlorophenol at a concentration of 0.1 g/100 mL.

The polyesters are ground to pass a 3 mm screen, dried at 100° C. in a vacuum oven for 24 hrs., and injection-molded on a 1-oz. Watson Stillman molding machine to give 1/16-in. thick D1822 Type L tensile bars. The tensile strength is determined following the procedure of ASTM D638.

Example 1 illustrates the preparation of a polymer consisting of 100 mol % trans-4,4'-stilbenedicarboxylic acid units, 70 mol % 1,4-butanediol units, and 30 mol % 1,6-hexanediol units.

A mixture of 177.6 g (0.60 mol) dimethyl trans-4,4'-stilbenedicarboxylate, 75.6 g (0.84 mol) 1,4-butanediol, 31.9 g (0.27 mol) 1,6-hexanediol, and 0.12 g titanium tetraisopropoxide is placed in a 1-liter flask equipped with an inlet for nitrogen, a metal stirrer, and a short distillation column. The flask is heated for about 3 hrs. at 190° C. for 1 hr. at 220° C. and at 260° C. for about 45 min. The temperature is raised to 280° C. and a vacuum of 0.5 mm is gradually applied over the next 5 minutes. Full vacuum is maintained for about 15 minutes before the reaction is stopped. A very high melt viscosity, opaque polymer is obtained with an I.V. of 1.27. Injection-molded tensile bars of this polymer have a tensile strength of 35,000 psi.

The remaining polymers in Table 1 are prepared according to the procedure of Example 1.

TABLE 1

Tensile Strengths of Copolyesters of trans-4,4'-Stilbenedicarboxylic Acid, 1,6-Hexanediol, and 1,4-Butanediol

| Example | BD Content[a] mol % | HD Content[a] mol % | Molding Temp.[b] °C. | I.V. Before Molding | I.V. After Molding | Tensile Strength $10^3$ psi |
|---|---|---|---|---|---|---|
| Control | 100[d] | 0 | 320 | 1.19 | 1.03 | 17.0 |
| Control | 100[d] | 0 | 325 | 1.13[e] | 0.96 | 15.5 |
| Control | 100[d] | 0 | 330 | 1.13[e] | 0.95 | 17.7 |
| Control | 100[d] | 0 | 335 | 1.13[e] | 0.91 | 14.4 |
| — | 94[f] | 6 | 315 | 1.43 | 1.21 | 20.0 |
| — | 90[g] | 10 | 295 | 1.24 | 1.34 | 33.7 |
| 1 | 70 | 30 | 275 | 1.27 | 1.15 | 35.0 |
| — | 70 | 30 | 280 | 1.10 | 1.13 | 31.4 |
| — | 45 | 45 | 275 | 1.26 | 1.11 | 30.0 |
| — | 30 | 70 | 275 | 1.49 | 1.48 | 28.9 |
| — | 10 | 90 | 260 | 1.37 | 1.23 | 31.1 |
| — | 7 | 93 | 265 | 1.61 | 1.35 | 29.4 |
| Control | 0 | 100 | 265 | 1.00 | 1.00 | 17.7 |
| Control | 0 | 100 | 265 | 1.40 | 1.21[e] | 20.9 |

[a]BD content and HD content are determined using proton NMR spectroscopy.
[b]The polymers are molded on a 1-oz Watson-Stillman molding machine.
[c]Inherent viscosities are determined in 25/35/40 phenol-tetrachloroethane/p-chlorophenol at a concentration of 0.1 g/100 mL at 25° C.
[d]This polymer solidified during melt preparation. Solid-phase polymerization is used to prepare high molecular weight polymer.
[e]Insoluble material was reported during the I.V. determination.
[f]This polymer is prepared in the melt at 310° C.
[g]This polymer is prepared in the melt at 300° C.
Codes:
SDA = trans-4,4-stilbenedicarboxylic acid.
BD = 1,4-butanediol.
HD = 1,6-hexanediol.

From the above table, it is easily seen that the copolyesters having repeating units from both 1,4-butanediol and 1,6-hexanediol have unexpectedly high tensile strengths. Physical properties of these polymers make them especially suited for forming films, fibers and molding plastics. Chemical resistance to solvents such as methylene chloride, gasoline, and ethyl acetate is especially valuable.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A copolyester comprising repeating units from at least 80 mol % trans-4,4'-stilbenedicarboxylic acid, repeating units from about 5–95 mol % 1,4-butanediol and repeating units from about 95–5 mol % 1,6-hexanediol, the total mol % of acid components and glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

2. A copolyester according to claim 1 wherein the trans-4,4'-stilbenedicarboxylic acid is present in an amount of about 100 mol %.

3. A copolyester according to claim 1 wherein the acid component comprises up to 20 mol % of at least one other aromatic dicarboxylic acid having 8 to 20 carbon atoms.

4. A copolyester according to claim 1 wherein the I.V. is greater than 0.6.

5. A fiber comprising the copolyester of claim 1.

6. A film comprising the copolyester of claim 1.

7. A molded object comprising the copolyester of claim 1.

* * * * *